(12) United States Patent
Wang

(10) Patent No.: US 12,586,104 B2
(45) Date of Patent: Mar. 24, 2026

(54) OBJECT DISPLAY METHOD AND APPARATUS, ELECTRONIC DEVICE, AND COMPUTER READABLE STORAGE MEDIUM

(71) Applicant: BEIJING BYTEDANCE NETWORK TECHNOLOGY CO., LTD., Beijing (CN)

(72) Inventor: Mengxiao Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/310,939

(22) Filed: May 2, 2023

(65) Prior Publication Data

US 2023/0267514 A1     Aug. 24, 2023

Related U.S. Application Data

(63) Continuation of application No. PCT/CN2021/128803, filed on Nov. 4, 2021.

(30) Foreign Application Priority Data

Nov. 4, 2020    (CN) .......................... 202011217335.0

(51) Int. Cl.
*G06F 3/0481*          (2022.01)
*G06Q 30/0282*        (2023.01)
(52) U.S. Cl.
CPC ....... *G06Q 30/0282* (2013.01); *G06F 3/0481* (2013.01)
(58) Field of Classification Search
None
See application file for complete search history.

(56) References Cited

U.S. PATENT DOCUMENTS 8,386,336 B1    2/2013  Fox et al.
9,542,060 B1    1/2017  Brenner et al.
(Continued)

FOREIGN PATENT DOCUMENTS

CN        106296288 A        1/2017
CN        109618212 A        4/2019
(Continued)

OTHER PUBLICATIONS

Shendang: "How to write a review and add a follow-up review on the mobile phone Jingdong app", published year 2019, pp. 7-12 are relevant (Year: 2019).*

(Continued)

*Primary Examiner* — Tuyetlien T Tran
(74) *Attorney, Agent, or Firm* — Astute IP Law Group

(57)          ABSTRACT

A method and a device for displaying an object, an electronic device, and a computer-readable storage medium are provided according to the embodiments of the present disclosure. The method includes: displaying a first page, where the first page includes first content, a first option related to the first content, and a first object related to the first option; displaying a second page in response to detecting a trigger signal of the first option and a trigger signal of the first object, where the second page includes second content related to the first content and a second object related to the second content, and the second object is for providing access to the second content; and changing a display state of the second object in response to detecting a trigger signal of the second object.

19 Claims, 3 Drawing Sheets

(56) References Cited

U.S. PATENT DOCUMENTS

| | | | | |
|---|---|---|---|---|
| 10,275,808 | B1 * | 4/2019 | Agarwal | G06Q 30/0641 |
| 10,832,271 | B1 * | 11/2020 | Rule | G06Q 30/0282 |
| 10,929,738 | B1 * | 2/2021 | Balgañon | G06Q 30/0225 |
| 2007/0179835 | A1 | 8/2007 | Ott, IV et al. | |
| 2008/0071602 | A1 * | 3/2008 | Ojakaar | G06Q 30/0603 |
| | | | | 705/306 |
| 2008/0300982 | A1 | 12/2008 | Larson et al. | |
| 2009/0210444 | A1 * | 8/2009 | Bailey | G06Q 30/02 |
| 2010/0023373 | A1 | 1/2010 | Behera et al. | |
| 2010/0205550 | A1 * | 8/2010 | Chen | G06Q 30/02 |
| | | | | 715/811 |
| 2012/0245923 | A1 * | 9/2012 | Brun | G06F 40/242 |
| | | | | 704/E11.001 |
| 2013/0211892 | A1 | 8/2013 | Frohwein et al. | |
| 2013/0246972 | A1 | 9/2013 | Tateno | |
| 2013/0339180 | A1 | 12/2013 | Lapierre et al. | |
| 2014/0115498 | A1 * | 4/2014 | Jackson | G06Q 50/01 |
| | | | | 715/753 |
| 2014/0172638 | A1 * | 6/2014 | El-Hmayssi | G06Q 30/0613 |
| | | | | 705/26.41 |
| 2015/0286977 | A1 | 10/2015 | Schneeman | |
| 2017/0212883 | A1 * | 7/2017 | Kasai | G06F 16/335 |
| 2017/0213259 | A1 * | 7/2017 | Gruber | G06Q 30/0282 |
| 2018/0040000 | A1 | 2/2018 | Lewis et al. | |
| 2019/0278818 | A1 | 9/2019 | Villafane | |
| 2020/0151777 | A1 | 5/2020 | Casalino et al. | |
| 2021/0042025 | A1 * | 2/2021 | Haggerty | G06F 3/04812 |
| 2021/0056604 | A1 * | 2/2021 | Bawge | G06Q 30/0613 |
| 2022/0129958 | A1 * | 4/2022 | Kirwin | G06F 40/30 |
| 2022/0138606 | A1 * | 5/2022 | Pasour | G06T 11/206 |
| | | | | 706/52 |

FOREIGN PATENT DOCUMENTS

| | | | |
|---|---|---|---|
| CN | 110858378 | A | 3/2020 |
| CN | 111427493 | A | 7/2020 |
| CN | 112506596 | A | 3/2021 |
| JP | 2004-171554 | A | 6/2004 |
| JP | 2013-254288 | A | 12/2013 |
| JP | 2017-107305 | A | 6/2017 |
| JP | 7616741 | B2 | 1/2025 |
| WO | 2017/090764 | A1 | 6/2017 |
| WO | 2017094169 | A1 | 6/2017 |
| WO | 2020/138192 | A1 | 7/2020 |

OTHER PUBLICATIONS

International Search Report and Written Opinion issued in PCT/CN2021/128803, dated Jan. 19, 2022, 13 pages provided, with English translation.

Yin Xin, "Analysis of Factors Affecting Satisfaction with E-commerce Logistics Services Based on Online Reviews", China Master's Thesis Full-text Database, Economics and Management Science Series, No. 2, Feb. 15, 2017, pp. 12-22, with partial translation, cited in ISR.

"How to write a review and add a follow-up review on the mobile phone Jingdong app", Jun. 30, 2019, https://www.okqs.com.cn/content/8p77v7gp4.html, with English translation, cited in Office Action issued in corresponding Chinese Application.

"How to write a review and add a follow-up review on the mobile phone Jingdong app", by Dream in Shenxiang, Jul. 5, 2019,http://www.kafan.cn/edu/26601506.html, with English translation, cited in Office Action issued in corresponding Chinese Application.

Office Action issued in corresponding Chinese Application No. 202011217335.0, dated Mar. 2, 2022, with English translation.

Office Action issued in corresponding Chinese Application No. 202011217335.0, dated Apr. 19, 2023, with English translation.

Extended European Search Report and Written Opinion, European Patent Application No. 21888633.1, Mar. 19, 2024 (8 pages).

Notice of Reasons for Refusal, Japanese Patent Application No. 2023-526892, Jun. 25, 2024, with machine translation (6 pages).

Communication Pursuant to Article 94(3) EPC for European Patent Application No. 21888633.1, mailed on Dec. 6, 2024, 8 pages.

Office Action received for European Patent Application No. 21888633.1, mailed on Dec. 2, 2025, 10 pages.

\* cited by examiner

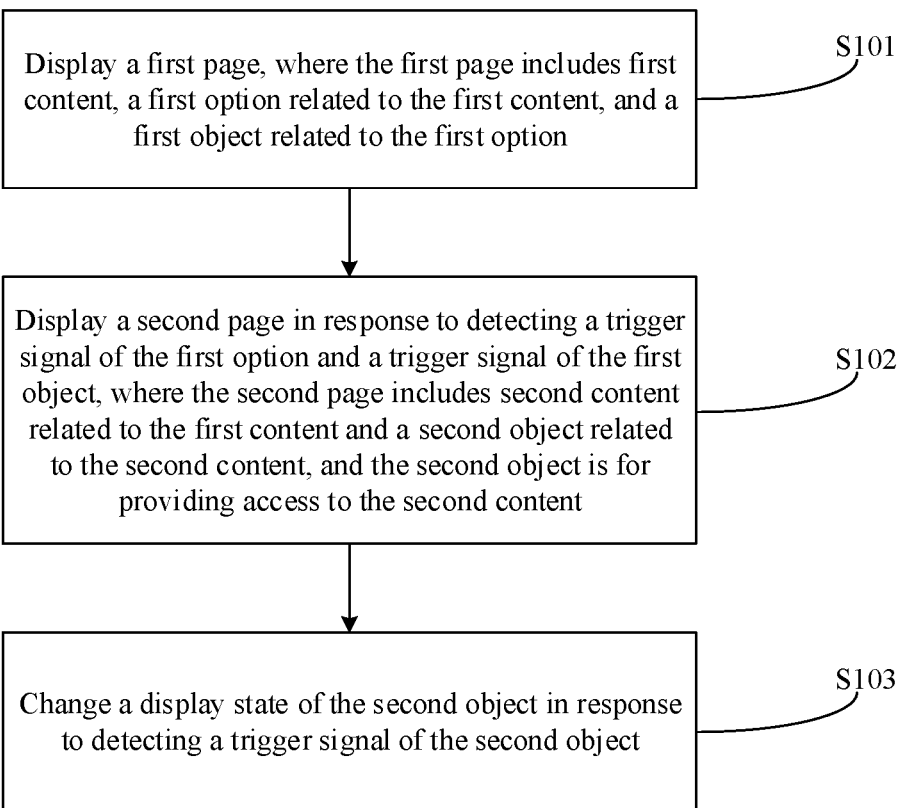

Display a first page, where the first page includes first content, a first option related to the first content, and a first object related to the first option — S101

Display a second page in response to detecting a trigger signal of the first option and a trigger signal of the first object, where the second page includes second content related to the first content and a second object related to the second content, and the second object is for providing access to the second content — S102

Change a display state of the second object in response to detecting a trigger signal of the second object — S103

FIG. 1

OBJECT DISPLAY METHOD AND APPARATUS, ELECTRONIC DEVICE, AND COMPUTER READABLE STORAGE MEDIUM

CROSS REFERENCE OF RELATED APPLICATION

The present application a continuation application of International Patent Application No. PCT/CN2021/128803, titled "OBJECT DISPLAY METHOD AND APPARATUS, ELECTRONIC DEVICE, AND COMPUTER READABLE STORAGE MEDIUM", filed on Nov. 4, 2021, which claims priority to Chinese Patent Application No. 202011217335.0, titled "OBJECT DISPLAY METHOD AND APPARATUS, ELECTRONIC DEVICE, AND COMPUTER READABLE STORAGE MEDIUM", filed on Nov. 4, 2020 with the China National Intellectual Property Administration, both of which are incorporated herein by reference in their entireties.

FIELD

The present disclosure relates to the field of content display, and in particular to a method and a device for displaying an object, an electronic device, and a computer-readable storage medium.

BACKGROUND

Many platforms currently provide content review functions. For example, the user may evaluate a product after purchasing the product, and comment on an article after watching a video or reading the article. The reviews may reflect the approval degree from the user to the evaluated content to some extent. In this case, in order to add the producer or provider of the content, e.g., a merchant or recommender of the product, the user has to search for the merchant or recommender before adding, resulting in a waste of resources.

SUMMARY

This summary is provided to introduce concepts in a simplified form. These concepts will be described in detail in the following detailed description. This summary is neither intended to identify key features or essential features of the claimed technical solution, nor intended to limit the scope of the claimed technical solution.

In order to solve the above technical problems, the following technical solutions are proposed in embodiments of the present disclosure.

In a first aspect, a method for displaying an object is provided according to an embodiment of the present disclosure. The method includes: displaying a first page, where the first page includes first content, a first option related to the first content, and a first object related to the first option; displaying a second page in response to detecting a trigger signal of the first option and a trigger signal of the first object, where the second page includes second content related to the first content and a second object related to the second content, and the second object is for providing access to the second content; and changing a display state of the second object in response to detecting a trigger signal of the second object.

In a second aspect, a device for displaying an object is provided according to an embodiment of the present disclosure. The device includes: a first display module and a second display module. The first display module is configured to display a first page. The first page includes first content, a first option related to the first content, and a first object related to the first option. The second display module is configured to: display a second page in response to detecting a trigger signal of the first option and a trigger signal of the first object, where the second page includes second content related to the first content and a second object related to the second content, and the second object is for providing access to the second content; and change a display state of the second object in response to detecting a trigger signal of the second object.

In a third aspect, an electronic device is provided according to an embodiment of the present disclosure. The electronic device includes at least one processor, and a memory communicatively connected to the at least one processor. The memory stores instructions executable by the at least one processor. The at least one processor is configured to execute the instructions, so as to perform the method in the first aspect.

In a fourth aspect, a non-transitory computer-readable storage medium is provided according to an embodiment of the present disclosure. The non-transitory computer-readable storage medium stores computer instructions that cause a computer to perform the method in the first aspect.

The method and the device for displaying an object, the electronic device, and the computer-readable storage medium are provided according to the embodiments of the present disclosure. The method includes: displaying a first page, where the first page includes first content, a first option related to the first content, and a first object related to the first option; displaying a second page in response to detecting a trigger signal of the first option and a trigger signal of the first object, where the second page includes second content related to the first content and a second object related to the second content, and the second object is for providing access to the second content; and changing a display state of the second object in response to detecting a trigger signal of the second object. The above method solves the problem of wasting resources due to a long access path of the second content by providing the access to the second content on the second page.

The above summary is only an overview of the technical solution of the present disclosure. In order to better understand the technical means of the present disclosure so that the present disclosure can be implemented according to the contents of the description, and in order to make the above and other objects, features and advantages of the present disclosure more comprehensible, preferred embodiments will be described in detail below together with the drawings.

BRIEF DESCRIPTION OF THE DRAWINGS

The above and other features, advantages and aspects of the various embodiments of the present disclosure will become more apparent with reference to the following detailed description in conjunction with the drawings. Throughout the drawings, the same or similar reference numerals denote the same or similar elements. It should be understood that the drawings are schematic and that components and elements are not necessarily drawn to scale.

FIG. 1 is a schematic flowchart of a method for displaying an object according to an embodiment of the present disclosure;

3

Figure 2:
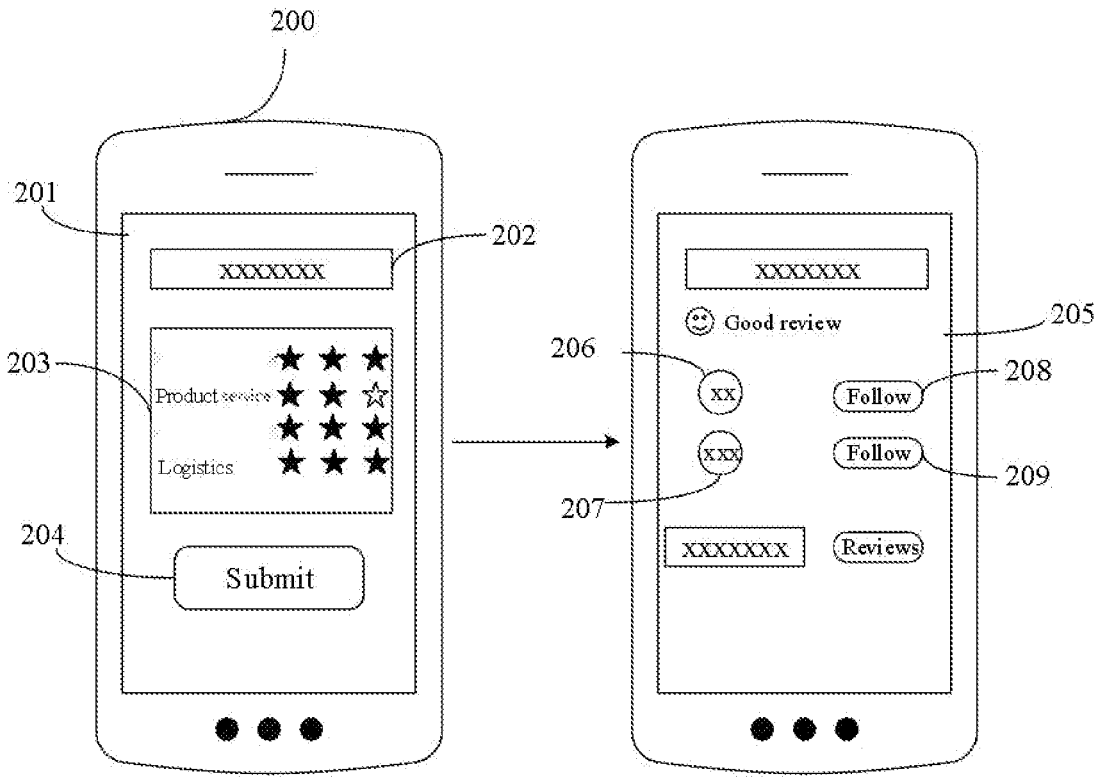

FIG. 2 is a schematic diagram of an application scenario of the method for displaying an object according to an embodiment of the present disclosure.

Figure 3:
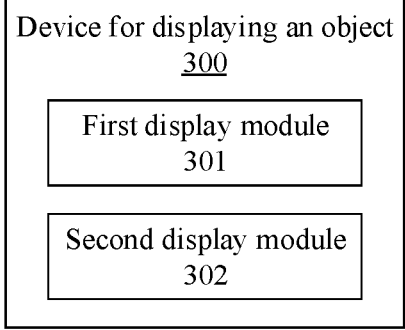
Figure 4:
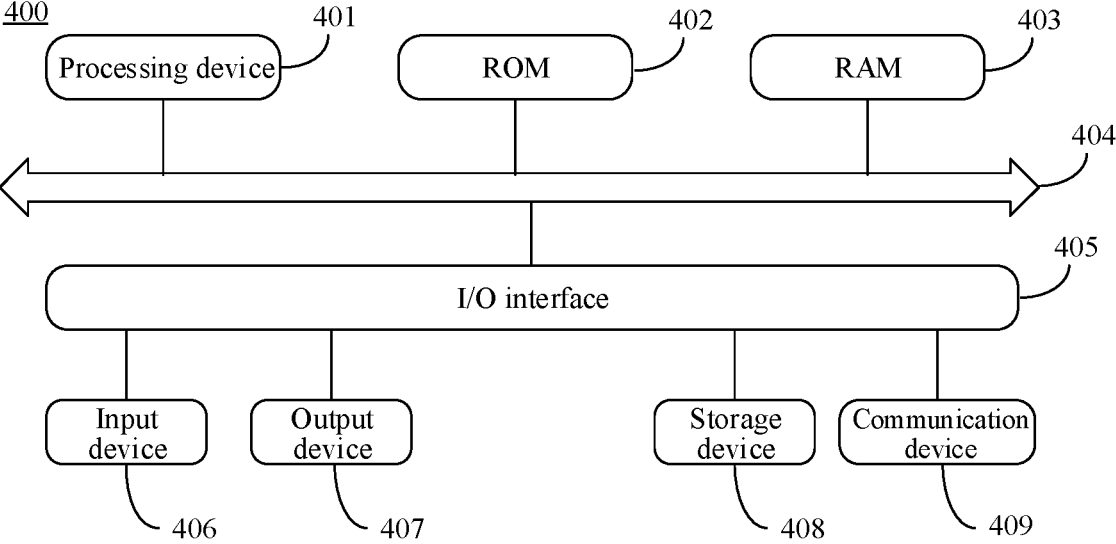

FIG. 3 is a schematic structural diagram of a device for displaying an object according to an embodiment of the present disclosure; and FIG. 4 is a schematic structural diagram of an electronic device according to an embodiment of the present disclosure.

DETAILED DESCRIPTION

Embodiments of the present disclosure will be described in more detail below with reference to the drawings. Although some embodiments of the present disclosure are shown in the drawings, it should be understood that the present disclosure may be embodied in various forms and should not be construed as limited to the embodiments set forth herein. Instead, these examples are provided so that the understanding of the present disclosure can be thorough and complete. It should be understood that the drawings and embodiments of the present disclosure are for illustrative purposes only, and are not intended to limit the protection scope of the present disclosure.

It should be understood that the various steps described in the method embodiments of the present disclosure may be performed in different orders, and/or performed in parallel. Additionally, method embodiments may include additional steps and/or illustrated steps may be not performed. The scope of the present disclosure is not limited in this regard.

The term "comprising" and its variations herein are non-exclusive, i.e., "including but not limited to". The term "based on" means "based at least in part on". The term "one embodiment" means "at least one embodiment." The term "another embodiment" means "at least one further embodiment". The term "some embodiments" means "at least some embodiments." Relevant definitions of other terms will be given in the description below.

It should be noted that concepts such as "first" and "second" mentioned herein are only for distinguishing different devices, modules or units, rather than limiting the sequence or interdependence of functions performed by these devices, modules or units.

It should be noted that the determiners of "a" and "a plurality" mentioned in the present disclosure are illustrative but not restrictive. Those skilled in the art should understand that, unless the context clearly indicates otherwise, such determiners should be understood as "one or more".

The names of messages or information exchanged between multiple devices in the embodiments of the present disclosure are used for illustrative purposes only, and are not used to limit the scope of these messages or information.

FIG. 1 is a flowchart of a method for displaying an object according to an embodiment of the present disclosure. The method for displaying an object provided in this embodiment may be performed by an object display device. The object display device may be implemented as software, or as a combination of software and hardware. The object display device may be integrated in an apparatus, e.g., an object display server or an object display terminal device, in an object display system. As shown in FIG. 1, the method includes the following steps S101 to S103.

In step S101, a first page is displayed. The first page includes first content, a first option related to the first content, and a first object related to the first option.

Optionally, the first page is a content display page in an application on a smart phone and includes the content to be displayed to the user and some functional options or components related to the content.

Exemplarily, the first content is information about a product purchased or used by the user. The first option indicates a rating of the first content, such as a review rating or a review score of the product. The first option includes multiple ratings, and one of the multiple ratings is selected through a trigger signal. Optionally, the first option includes ratings in multiple aspects related to the first content, such as ratings of product service. Optionally, the first object is a first component used to determine the rating. When the first object is triggered, the rating in the first option is determined to generate a user review rating for the first content. Exemplarily, the first object is a confirm or submit button. When the first object is triggered, the selected rating in the first option is determined.

Optionally, the first page also includes a review area, which includes review components, such as a review filling component and a picture uploading component, for receiving reviews such as text and pictures. When the first object is triggered, the text and picture are determined together with the rating.

In step S102, in response to detecting the trigger signal of the first option and the trigger signal of the first object, a second page is displayed. The second page includes second content related to the first content and a second object related to the second content. The second object is used to provide access to the second content.

Optionally, the trigger signal of the first option is generated through a human-computer interaction interface. For example, a touch signal is received in a display area of the first option on the first page through a touch screen so as to generate the trigger signal of the first option. The trigger signal of the first option is used to select the corresponding rating in the first option. Optionally, the trigger signal of the first object is generated through a human-computer interaction interface. For example, a touch signal is received in the display area of the first object on the first page through the touch screen so as to generate the trigger signal of the first object. The trigger signal of the first object is used to trigger the first object so as to determine the selected rating in the first option.

Optionally, the step S102 includes: displaying the second page in response to detecting a trigger signal representing the first option of the first rating and a trigger signal of the first component.

As shown in the alternative embodiment above, multiple ratings are included in the first option. The first object is the first component. When the selected rating in the first option is the first rating, and the first rating is confirmed, the second page is displayed. Exemplarily, the first rating indicates a high rating, that is, the user evaluates the first content as favorable. Optionally, the first rating is determined by ratings in multiple aspects related to the first content. The comprehensive rating determined by the selection of multiple ratings such as product service is the first rating. In this embodiment, when the rating of the first option is the first rating and the first component is triggered, the second page is displayed.

The second page includes second content related to the first content and the second object related to the second content. Optionally, the second content is information about the producer or provider of the first content. Exemplarily, the first content is product information, and the second content is account information of the provider or recommender of the product. The second object is used to provide access to the second content. Optionally, the second object is a second component for adding the second content. Exemplarily, the second object is a follow button of the second content. As shown in the above example, the second content is the account information of the provider or recommender of the product. The second object is an account follow button of the provider or the recommender of the product.

Optionally, the second page includes multiple display areas. The rating information of the first content is displayed in a first display area among the multiple display areas. The second content and the second object are displayed in a second display area among the multiple display areas. Exemplarily, the second page includes multiple display areas from top to bottom. The first content and rating information about the first content, e.g., the product information and the first rating information in the above example, are displayed in the first display area. The account and the follow button of the product provider and/or the account and the follow button of the product recommender are displayed in the second display area.

Optionally, third content and a third object related to the third content are displayed in a third display area among the multiple display areas on the second page. The first page is displayed in response to detecting the trigger signal of the third object. The first page includes the third content, a second option related to the third content, and a fourth object related to the second option. In this embodiment, the third content and the third object are further displayed on the second page. Exemplarily, the third content is other product information. The third object is a review trigger button. Detection of the trigger signal of the review trigger button indicates that the user has triggered the review button, and the first page is displayed. The first page is used to receive review information about the other product. That is, the first page includes the third content, the second option related to the third content, and the fourth object related to the second option. Exemplarily, the second option is the same as the first option, includes the same items, and is used to evaluate the other product. The fourth object is the same as the first object, and is used to determine the review, which is not described in detail herein.

In step S103, the display state of the second object is changed in response to detecting the trigger signal of the second object.

Optionally, the second object is a second component for adding the second content. The second component receives the trigger signal through a human-computer interaction interface. When the user touches a display position of the second component through a human-computer interaction interface, e.g., a touch screen, the trigger signal is generated. In this case, the second content is added to follow column or favorite column of the user, and the display state of the second object is changed.

Optionally, the step S103 includes: setting the second component to a first state in response to detecting a trigger signal of the second component. The first state indicates that the second content has been added. Optionally, the first state is that the color of the second component changes. Exemplarily, the first state is that the color of the second component is gray, indicating that the second content has been added, which means that the second content is added to an entry that is convenient for access, such as a follow bar or favorite bar of the user, so that the user can easily access the second content.

In the above embodiment, the first page for displaying the first content, the first option related to the first content, and the first object related to the first option are provided according to the method for displaying an object. The second page is displayed by triggering the first option and the first object. The second page includes a second object for providing access to the second content, thereby saving resources consumed by the user to find the second content.

Further, the method further includes: displaying a third page in response to detecting a trigger signal of the second content. The third page is used to display information related to the second content. Optionally, the second content is a third component, configured to display the second content and provide access to information related to the second content. Exemplarily, the second content is an access button. When a trigger signal of the access button is detected, the third page is displayed. Information related to the second content is displayed on the third page. Exemplarily, the second content is an access button of the product provider. A name, an icon and the like of the product provider are displayed in the area of the button. When the user clicks the access button, a presentation page of the product provider is displayed. The presentation page is used to present the products provided by the product provider. The user may browse the third content by visiting the third page to determine whether to trigger the second object to add access to the second content.

FIG. 2 is a schematic diagram of an application scenario of an embodiment of the present disclosure. As shown in FIG. 2, in this application scenario, an e-commerce application runs on a terminal device 200. After the user purchases the product, the first page, that is, the product review page 201 is displayed on the terminal device 200. The first page displays: the first content, i.e., product information 202; the first option, i.e., a review option 203; and the first object, i.e., a submit button 204. The review option includes scoring options in four aspects, namely, product service and logistics. Each scoring option includes 3 ratings, namely, 1 star, 2 stars and 3 stars. A total of 12 stars in the 4 aspects. The default is more than 9 stars for positive review. As shown in FIG. 2, when the review option receives the trigger signal of the corresponding option, the corresponding star is lit. In this example, the user triggers 11 stars, indicating that the user leaves a positive review on the product displayed in 202. When the submit button 204 is triggered, the second page, i.e., the review success page 205, is displayed on the terminal device 200. The product information and the review result are displayed on the review success page. If the review result is positive, the second content and the second object are displayed on the second page. In this application scenario, the second content is the account information 206 of the product provider and the account information 207 of the product recommender. The second object is the follow button 208 of the account information 206 of the product provider and the follow button 209 of the account information 207 of the product recommender. Therefore, when the user leaves a positive review on the product and does not follow the product provider and/or the product recommender, follow access to the product provider and/or product recommender is displayed to the user on the review success page, so that the user can conveniently follow the product provider and/or product recommender. As shown in the above embodiment, the review success page 205 may also display the information of other products that the user has purchased and has not evaluated and the corresponding review button, so that the user can return to the product review page to evaluate other products by triggering the review button.

A method for displaying an object is disclosed according to an embodiment of the present disclosure. The method includes: displaying a first page, where the first page includes first content, a first option related to the first content, and a first object related to the first option; displaying a second page in response to detecting a trigger signal of the first option and a trigger signal of the first object, where the second page includes second content related to the first content and a second object related to the second content, and the second object is used to provide access to the second content; and changing a display state of the second object in response to detecting a trigger signal of the second object. The above method solves the problem of wasting resources due to the long access path of the second content by providing the access to the second content on the second page.

Although the steps in the above method embodiments are described in the above order, it should be clear to those skilled in the art that the steps in the embodiments of the present disclosure are not necessarily performed in the above order. Alternatively, the steps may be performed in reverse, parallel, interleaved, or other sequences. Moreover, on the basis of the above steps, those skilled in the art may also add other steps. These obvious modifications or equivalent replacements should also be included in the protection scope of the present disclosure, and are not described in detail herein.

FIG. 3 is a schematic structural diagram of a device for displaying an object according to an embodiment of the present disclosure. As shown in FIG. 3, the device 300 includes: a first display module 301 and a second display module 302.

The first display module 301 is configured to display a first page. The first page includes first content, a first option related to the first content, and a first object related to the first option.

The second display module 302 is configured to display a second page in response to detecting a trigger signal of the first option and a trigger signal of the first object, where the second page includes second content related to the first content and a second object related to the second content, and the second object is used to provide access to the second content; and change a display state of the second object in response to detecting a trigger signal of the second object.

Further, the first option indicates a rating of the first content. The first object is a first component used to determine the rating.

Further, the second display module 302 is further configured to: display the second page in response to detecting a trigger signal representing a first option of a first rating and a trigger signal of the first component.

Further, the second page includes multiple display areas. Rating information of the first content is displayed in a first display area among the multiple display areas. The second content and the second object are displayed in a second display area among the multiple display areas.

Further, third content and a third object related to the third content are displayed in a third display area among the multiple display areas on the second page. The second display module 302 is further configured to: display the first page in response to detecting a trigger signal of the third object. The first page includes third content, a second option related to the third content, and a fourth object related to the second option.

Further, the second object is a second component for adding the second content.

Further, the second display module 302 is further configured to: set the second component to a first state in response to detecting a trigger signal of the second component. The first state indicates that the second content has been added.

Further, the second content is information about a producer or provider of the first content.

Further, the second display module 302 is further configured to: display a third page in response to detecting a trigger signal of the second content. The third page is used to display information related to the second content.

The device shown in FIG. 3 may perform the method in the embodiment shown in FIG. 1. For the parts not described in detail in this embodiment, reference may be made to the relevant description of the embodiment shown in FIG. 1. Details about the process and technical effects of this technical solution may refer to the description in the embodiment shown in FIG. 1, and thus are not repeated here.

Reference is made to FIG. 4, which is a schematic structural diagram of an electronic device 400 suitable for implementing the embodiments of the present disclosure. The terminal device in the embodiments of the present disclosure may include but not limited to mobile terminals such as mobile phones, notebook computers, digital broadcast receivers, PDAs (personal digital assistants), PADs (tablet computers), PMPs (portable multimedia players) and vehicle terminals (such as car navigation terminals); and fixed terminals such as digital TVs and desktop computers. The electronic device shown in FIG. 4 is only an example, and should not limit the functions and application scope of the embodiments of the present disclosure.

As shown in FIG. 4, the electronic device 400 may include a processing device (such as a central processing unit and a graphics processing unit) 401. The processing device 401 can execute various appropriate actions and processes according to programs stored in a read only memory (ROM) 402 or loaded from a storage device 408 into a random-access memory (RAM) 403. In the RAM 403, various programs and data necessary for the operation of the electronic device 400 are also stored. The processing device 401, the ROM 402 and the RAM 403 are connected to each other through a bus 404. An input/output (I/O) interface 405 is also connected to the bus 404.

Generally, the following devices may be connected to the I/O interface 405: input devices 406 including, for example, a touch screen, a touch pad, a keyboard, a mouse, a camera, a microphone, an accelerometer, a gyroscope, etc.; output devices 407 including, for example, a liquid crystal display (LCD), a speaker, a vibrator, etc.; a storage device 408 including, for example, a magnetic tape, a hard disk, etc.; and a communication device 409. The communication device 409 may allow the electronic device 400 to perform wireless or wired communication with other devices to exchange data. Although FIG. 4 shows the electronic device 400 having various means, it should be understood that implementing or having all of the devices shown is not a requirement. More or fewer devices may alternatively be implemented or provided.

In particular, according to an embodiment of the present disclosure, the processes described above with reference to the flowcharts may be implemented as computer software programs. For example, embodiments of the present disclosure provide a computer program product. The computer program product includes a computer program carried on a non-transitory computer-readable medium. The computer program contains program code for carrying out the methods shown in the flowcharts. In such an embodiment, the computer program may be downloaded and installed from a network via the communication device 409, or from the storage device 408, or from the ROM 402. When the computer program is executed by the processing device 401, the functions defined in the methods of the embodiments of the present disclosure are performed.

It should be noted that the above computer-readable medium in the present disclosure may be a computer-readable signal medium or a computer-readable storage medium or any combination of the above two. The computer readable storage medium may be, for example, but not limited to, an electrical, magnetic, optical, electromagnetic, infrared, or semiconductor system, apparatus, or device, or any combination thereof. More specific examples of the computer-readable storage medium may include, but are not limited to: electrical connections with one or more wires, portable computer disks, hard disks, a random-access memory (RAM), a read only memory (ROM), an erasable programmable read-only memory (EPROM or Flash), optical fibers, a compact disk read-only memory (CD-ROM), optical storage devices, magnetic memory components, or any suitable combination of the above. In the present disclosure, the computer-readable storage medium may be any tangible medium that contains or stores a program. The program may be used by or in conjunction with the instruction execution system, apparatus or device. In the present disclosure, however, the computer-readable signal medium may include a data signal propagated in baseband or as part of a carrier wave, and the data signal carries computer-readable program code. Such propagated data signals may be in various forms, including but not limited to electromagnetic signals, optical signals, or any suitable combination of the foregoing. The computer-readable signal medium may also be any computer-readable medium other than the computer-readable storage medium. The computer-readable signal medium may transmit, propagate, or transport a program for use by or in connection with an instruction execution system, apparatus, or device. Program code embodied on the computer-readable medium may be transmitted by any appropriate medium, including but not limited to: wires, optical cables, RF (radio frequency), etc., or any suitable combination of the above.

In some embodiments, a client may communicate with a server using any currently known or future-developed network protocols such as HTTP (Hypertext Transfer Protocol), and the client and the server may be interconnected with digital data communication of any form or medium (e.g., a communication network). Examples of the communication network include local area networks ("LANs"), wide area networks ("WANs"), internetworks (e.g., the Internet), peer-to-peer networks (e.g., ad hoc peer-to-peer networks), as well as any currently known or future developed network.

The computer-readable medium may be included in the electronic device, or may exist independently without being incorporated into the electronic device.

The computer-readable medium carries one or more programs, when being executed by the electronic device, causes the electronic device to perform the method for displaying an object in the above embodiments.

The computer program code for carrying out operations of the present disclosure may be written in one or more programming languages, or a combination thereof. Such programming languages include, but are not limited to, object-oriented programming languages such as Java, Smalltalk, C++, and conventional procedural programming languages such as the "C" language or similar programming languages. The program code may be executed entirely on the user computer, partly on the user computer, as a stand-alone software package, partly on the user computer and partly on a remote computer or entirely on a remote computer or server. Where a remote computer is involved, the remote computer may be connected to the user computer through any kind of network including a local area network (LAN) or a wide area network (WAN), or may be connected to an external computer (e.g., via the Internet by an Internet service provider).

The flowcharts and block diagrams in the drawings illustrate the architecture, functionality, and operation of possible implementations of systems, methods and computer program products according to various embodiments of the present disclosure. In this regard, each block in the flowchart or block diagram may represent a module, program segment, or portion of code. The module, program segment, or portion of code contains one or more executable instructions for implementing specified logical functions. It should also be noted that, in some alternative implementations, the functions noted in the block may occur in an order different form the order noted in the drawings. For example, two blocks shown in succession could, in fact, be executed substantially concurrently or in reverse order, depending upon the functionality involved. Further, each block in the block diagrams and/or flow charts, and a combination of blocks in the block diagrams and/or flow diagrams may be performed by a dedicated hardware-based system that performs the specified functions or operations or by a combination of dedicated hardware and computer instructions.

The units involved in the embodiments described in the present disclosure may be implemented by software or by hardware. The name of a unit does not in any way constitute a qualification of the unit itself.

The functions described herein may be performed at least in part by one or more hardware logic components. For example, without limitation, exemplary types of hardware logic components that may be used include: field programmable gate arrays (FPGAs), application specific integrated circuits (ASICs), application specific standard products (ASSPs), system on chips (SOCs), complex programmable logical devices (CPLDs), etc.

In the context of the present disclosure, the machine-readable medium may be a tangible medium that may contain or store a program for use by or in conjunction with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the foregoing. More specific examples of the machine-readable storage medium may include one or more wire-based electrical connections, portable computer disks, hard disks, a random-access memory (RAM), a read only memory (ROM), an erasable programmable read only memory (EPROM or flash memory), fiber optics, a compact disk read-only memory (CD-ROM), optical storage devices, magnetic storage devices, or any suitable combination of the foregoing.

According to one or more embodiments of the present disclosure, there is provided a method of displaying an object. The method includes:

displaying a first page, where the first page includes first content, a first option related to the first content, and a first object related to the first option;

displaying a second page in response to detecting a trigger signal of the first option and a trigger signal of the first object, where the second page includes second content related to the first content and a second object related to the second content, and the second object is for providing access to the second content; and changing a display state of the second object in response to detecting a trigger signal of the second object.

Further, the first option indicates a rating of the first content, and the first object is a first component for determining the rating.

Further, the displaying a second page in response to detecting a trigger signal of the first option and a trigger signal of the first object includes: displaying the second page in response to detecting a trigger signal representing the first option of a first rating and a trigger signal of the first component.

Further, the second page includes multiple display areas, where rating information of the first content is displayed in a first display area among the multiple display areas, and the second content and the second object are displayed in a second display area among the multiple display areas.

Further, third content and a third object related to the third content are displayed in a third display area among the multiple display areas, where the method further includes: displaying the first page in response to detecting a trigger signal of the third object, where the first page includes the third content, a second option related to the third content, and a fourth object related to the second option.

Further, the second object is a second component for adding the second content.

Further, the changing a display state of the second object in response to detecting a trigger signal of the second object includes: setting the second component to a first state in response to detecting a trigger signal of the second component, where the first state indicates that the second content has been added.

Further, the second content is information about a producer or provider of the first content.

Further, the method includes: displaying a third page in response to detecting a trigger signal of the second content, where the third page is for displaying information related to the second content.

According to one or more embodiments of the present disclosure, there is provided a device for displaying an object. The device includes:

a first display module configured to display a first page, where the first page includes first content, a first option related to the first content, and a first object related to the first option; and a second display module configured to: display a second page in response to detecting a trigger signal of the first option and a trigger signal of the first object, where the second page includes second content related to the first content and a second object related to the second content, and the second object provides access to the second content; and change a display state of the second object in response to detecting a trigger signal of the second object.

Further, the first option indicates a rating of the first content, and the first object is a first component configured to determine the rating.

Further, the second display module is further configured to: display the second page in response to detecting a trigger signal representing a first option of a first rating and a trigger signal of the first component.

Further, the second page includes multiple display areas. Rating information of the first content is displayed in a first display area among the multiple display areas. The second content and the second object are displayed in a second display area among the multiple display areas.

Further, third content and a third object related to the third content are displayed in a third display area among the multiple display areas on the second page. The second display module is further configured to: display the first page in response to detecting a trigger signal of the third object. The first page includes third content, a second option related to the third content, and a fourth object related to the second option.

Further, the second object is a second component for adding the second content.

Further, the second display module is further configured to: set the second component to a first state in response to detecting a trigger signal of the second component. The first state indicates that the second content has been added.

Further, the second content is information about the producer or provider of the first content.

Further, the second display module is further configured to: display a third page in response to detecting a trigger signal of the second content. The third page is for displaying information related to the second content.

According to one or more embodiments of the present disclosure, there is provided an electronic device. The electronic device includes at least one processor, and a memory communicatively connected to the at least one processor. The memory stores instructions executable by the at least one processor. The at least one processor is configured to execute the instructions, so as to perform the method in the first aspect.

According to one or more embodiments of the present disclosure, there is provided a non-transitory computer-readable storage medium. The non-transitory computer-readable storage medium stores computer instructions that cause a computer to perform the method for displaying an object.

Only preferred embodiments of the present disclosure and an illustration of the applied technical principle are described above. Those skilled in the art should understand that, the scope of the present disclosure is not limited to the technical solution formed by specific combinations of the above technical features, but also covers other technical solutions formed by any combination of the above technical features or their equivalent features without departing from the above disclosed concept, for example, a technical solution formed by replacing the above features with technical features with similar functions disclosed in (but not limited to) the present disclosure.

The invention claimed is:

1. A method for displaying an object, comprising:

displaying a first page, wherein the first page comprises first content, a first option related to the first content, and a first object related to the first option, the first option indicates that user reviews the first content as favorable, the first content comprises product information of a product;

displaying a second page in response to detecting a trigger signal of the first option and a trigger signal of the first object, wherein the second page comprises second content related to the first content and a second object related to the second content, and the second object is for providing access to the second content, the second content comprises account information corresponding to recommender of the product, the second page comprises third content and a third object related to the third content, the third content is other product information different from the first content; and changing a display state of the second object in response to detecting a trigger signal of the second object; and displaying the first page and loading a review option and review submission control corresponding to the third content on the first page in response to detecting a trigger signal of the third object.

2. The method for displaying an object according to claim 1, wherein the first option indicates a rating of the first content, and the first object is a first component for determining the rating.

3. The method for displaying an object according to claim 2, wherein the displaying the second page in response to detecting the trigger signal of the first option and the trigger signal of the first object comprises:

displaying the second page in response to detecting a trigger signal representing the first option of a first rating and a trigger signal of the first component.

4. The method for displaying an object according to claim 1, wherein the second page comprises a plurality of display areas, wherein rating information of the first content is displayed in a first display area among the plurality of display areas, and the second content and the second object are displayed in a second display area among the plurality of display areas.

5. The method for displaying an object according to claim 4, wherein the third content and the third object related to the third content are displayed in a third display area among the plurality of display areas, wherein the method further comprises:

displaying the first page in response to detecting the trigger signal of the third object, wherein the first page comprises the third content, a second option related to the third content, and a fourth object related to the second option.

6. The method for displaying an object according to claim 1, wherein the second object is a second component for adding the second content.

7. The method for displaying an object according to claim 6, wherein the changing the display state of the second object in response to detecting the trigger signal of the second object comprises:

setting the second component to a first state in response to detecting a trigger signal of the second component, wherein the first state indicates that the second content has been added.

8. The method for displaying an object according to claim 1, wherein the second content is information about a producer or provider of the first content.

9. The method for displaying an object according to claim 1, further comprising:

displaying a third page in response to detecting a trigger signal of the second content, wherein the third page is for displaying information related to the second content.

10. The method for displaying an object according to claim 2, wherein the second page comprises a plurality of display areas, wherein rating information of the first content is displayed in a first display area among the plurality of display areas, and the second content and the second object are displayed in a second display area among the plurality of display areas.

11. The method for displaying an object according to claim 3, wherein the second page comprises a plurality of display areas, wherein rating information of the first content is displayed in a first display area among the plurality of display areas, and the second content and the second object are displayed in a second display area among the plurality of display areas.

12. The method for displaying an object according to claim 10, wherein the third content and the third object related to the third content are displayed in a third display area among the plurality of display areas, wherein the method further comprises:

displaying the first page in response to detecting the trigger signal of the third object, wherein the first page comprises the third content, a second option related to the third content, and a fourth object related to the second option.

13. The method for displaying an object according to claim 11, wherein the third content and the third object related to the third content are displayed in a third display area among the plurality of display areas, wherein the method further comprises:

displaying the first page in response to detecting the trigger signal of the third object, wherein the first page comprises the third content, a second option related to the third content, and a fourth object related to the second option.

14. A device for displaying an object, comprising:

at least one processor; and at least one memory communicatively coupled to the at least one processor and storing instructions that upon execution by the at least one processor cause the device to:

display a first page, wherein the first page comprises first content, a first option related to the first content, and a first object related to the first option, the first option indicates that user reviews the first content as favorable, the first content comprises product information of a product; and display a second page in response to detecting a trigger signal of the first option and a trigger signal of the first object, wherein the second page comprises second content related to the first content and a second object related to the second content, and the second object provides access to the second content, the second content comprises account information corresponding to recommender of the product, the second object comprises an account follow control corresponding to the recommender of the product, the second page comprises third content and a third object related to the third content, the third content is other product information different from the first content; and change a display state of the second object in response to detecting a trigger signal of the second object; and display the first page and load a review option and review submission control corresponding to the third content on the first page in response to detecting a trigger signal of the third object.

15. The device of claim 14, wherein the first option indicates a rating of the first content, and the first object is a first component for determining the rating.

16. The device of claim 14, wherein the second object is a second component for adding the second content.

17. The device of claim 14, wherein the second content is information about a producer or provider of the first content.

18. The device of claim 14, the at least one memory further storing instructions that upon execution by the at least one processor cause the device to: display a third page in response to detecting a trigger signal of the second content, wherein the third page is for displaying information related to the second content.

19. A non-transitory computer-readable storage medium for storing non-transitory computer-readable instructions, wherein the non-transitory computer-readable instructions, when executed by a computer, cause the computer to display a first page, wherein the first page comprises first content, a first option related to the first content, and a first object related to the first option, the first option indicates that user reviews the first content as favorable, the first content comprises product information of ₅ a product;

display a second page in response to detecting a trigger signal of the first option and a trigger signal of the first object, wherein the second page comprises second content related to the first content and a second object ₁₀ related to the second content, and the second object is for providing access to the second content, the second content comprises account information corresponding to recommender of the product, the second object comprises an account follow control corresponding to ₁₅ the recommender of the product, the second page comprises third content and a third object related to the third content, the third content is other product information different from the first content; and change a display state of the second object in response to ₂₀ detecting a trigger signal of the second object; and display the first page and load a review option and review submission control corresponding to the third content on the first page in response to detecting a trigger signal of the third object. ₂₅

* * * * *